United States Patent [19]

Boero

[11] Patent Number: 5,001,338
[45] Date of Patent: Mar. 19, 1991

[54] BODY POSITION SENSOR BY PHASE COMPARISON OF MODULATED LIGHT WAVES TRANSMITTED THROUGH OPTICAL FIBER

[75] Inventor: Paolo Boero, Milan, Italy

[73] Assignee: Societa' Cavi Pirelli S.p.A., Milan, Italy

[21] Appl. No.: 569,760

[22] Filed: Aug. 21, 1990

Related U.S. Application Data

[63] Continuation of Ser. No. 329,690, Mar. 28, 1989, abandoned.

[30] Foreign Application Priority Data

Apr. 21, 1988 [IT] Italy ................... 20270 A/88

[51] Int. Cl.⁵ .................... H01J 5/16; G01C 3/08
[52] U.S. Cl. .................... 250/227.21; 356/5; 250/227.23
[58] Field of Search ........... 250/561, 227, 226, 560, 250/201.9, 227.23, 227.21; 356/373, 375, 4, 5

[56] References Cited

U.S. PATENT DOCUMENTS

| | | | |
|---|---|---|---|
| 3,437,820 | 4/1969 | Thompson, Jr. et al. | 356/5 |
| 3,619,057 | 11/1971 | Castellano et al. | 356/5 |
| 3,625,619 | 12/1971 | Scholdstrom | 356/5 |
| 3,652,161 | 3/1972 | Ross | 356/5 |
| 4,005,936 | 2/1977 | Redman et al. | 356/5 |
| 4,102,572 | 7/1978 | O'Meara | 356/5 |
| 4,356,396 | 10/1982 | Ruell et al. | 250/227.23 |
| 4,397,548 | 8/1983 | McCormack | 356/4 |
| 4,523,092 | 6/1985 | Nelson | 250/227.23 |
| 4,644,154 | 2/1987 | Bragardh et al. | 250/227.23 |
| 4,670,649 | 6/1987 | Senior et al. | 250/227 |
| 4,694,690 | 9/1987 | Jones et al. | 250/227.23 |
| 4,703,175 | 10/1987 | Salour et al. | 250/227.23 |
| 4,808,813 | 2/1989 | Champetier | 250/227.23 |
| 4,895,441 | 1/1990 | Allen, Jr. | 356/5 |

FOREIGN PATENT DOCUMENTS

1184955 3/1970 United Kingdom .................... 356/4

OTHER PUBLICATIONS

Querzola, "High Accuracy Distance Measurement by Two-Wavelength Pulsed Laser Sources", *Applied Optics*, vol. 18, No. 17, 9/79, pp. 3035-3047.

*Primary Examiner*—David C. Nelms
*Assistant Examiner*—Michael Messinger
*Attorney, Agent, or Firm*—Brooks Haidt Haffner & Delahunty

[57] ABSTRACT

An optical position sensor for indicating the position of a movable body with respect to a reference point. A first optical signal at one wavelength and a second optical signal at a different wavelength, both modulated at a radio frequency, are transmitted through an optical fiber to the reference point at which a semi-reflecting mirror which passes the first signal and reflects the second signal is disposed. The first signal is reflected by the body into the optical fiber, and a phase comparator coupled to the fiber compares the phases of the modulating signals on the reflected first signal and the reflected second signal to determine the position of the body relative to the mirror.

11 Claims, 1 Drawing Sheet

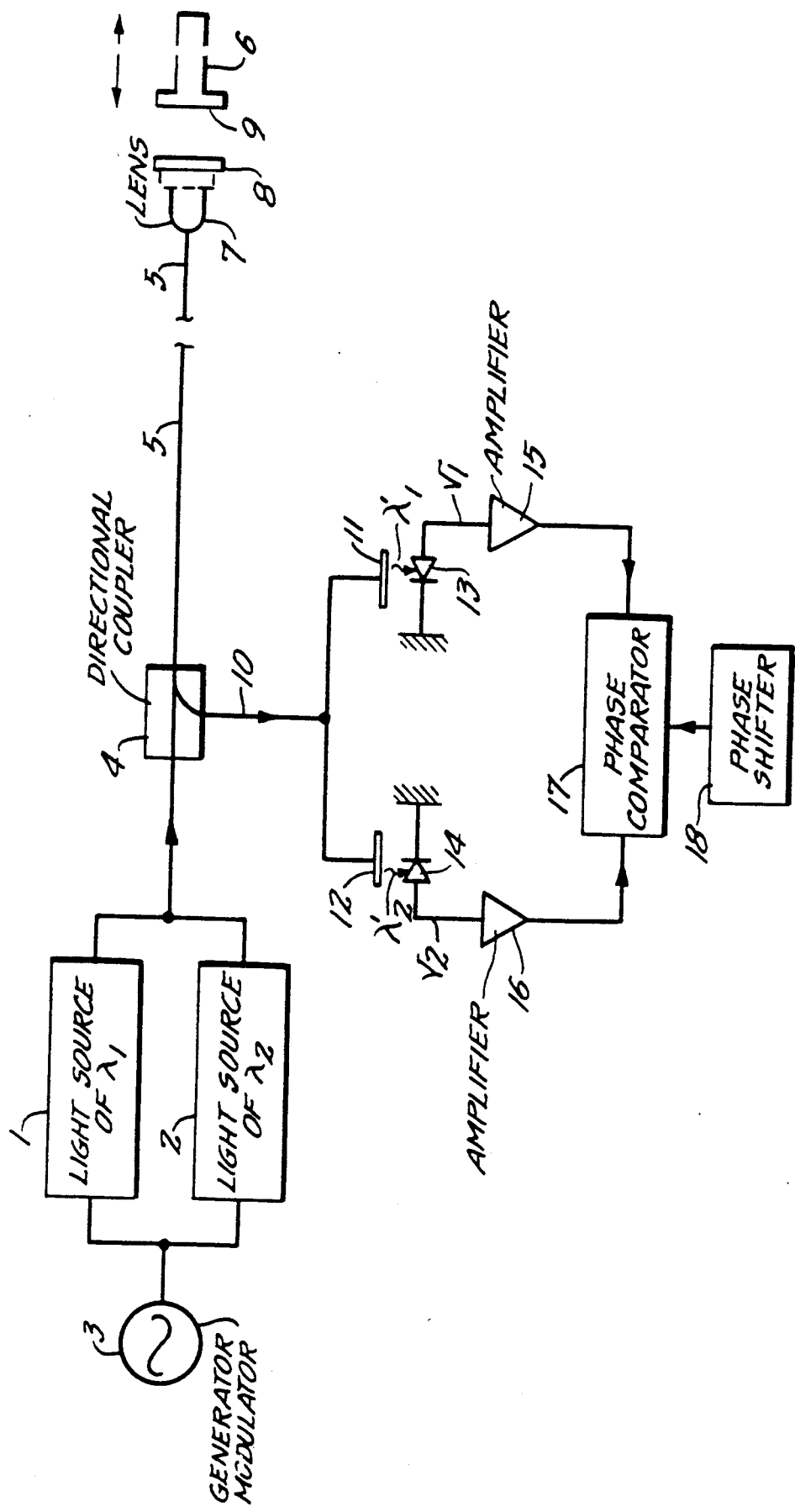

5,001,338

BODY POSITION SENSOR BY PHASE COMPARISON OF MODULATED LIGHT WAVES TRANSMITTED THROUGH OPTICAL FIBER

This application is a continuation of application Ser. No. 07/329,690, filed Mar. 28, 1989 now abandoned.

The present invention relates to an optical position sensor, and more particularly, it relates to an optical sensor able to measure the position of a movable body with respect to a fixed reference element, said movable body and said fixed reference element being remote from the generator of the optical signal, and in which the displacement of the remote movable body is converted into a phase variation of the optical signal transmitted to the remote area through an optical fiber.

BACKGROUND OF THE INVENTION

As known, there is apparatus which, for its operation, requires a determination of the displacement of movable bodies with respect to fixed reference elements situated in zones distant from the apparatus and in environments where the atmospheric conditions are severe and changeable. For example, the central control unit of an aircraft, situated in the pilot compartment, must know the position of the ailerons, and it is evident that the environmental conditions around the aircraft, such as temperature, pressure, humidity and so on, may be extremely variable.

It is also known that the most reliable instruments to measure such displacements are those of the optical type which, besides being simple and compact, have a low attenuation of the signal and have an immunity to electromagnetic disturbances.

Further, optical position sensors are known, which make use of a local, amplitude modulated monochromatic light source which, through an optical fiber, is conveyed to the remote area where the movable body whose position is to be determined is located. In said sensors, the modulated light exits from the free end of the optical fiber, strikes the surface of the movable body and is reflected into the optical fiber.

In this way, the light reflected by the movable body is phase displaced by an angle which is proportional to the distance between the movable body and the end of the optical fiber. The phase displaced light transits the optical fiber again and is locally compared to the modulating signal. In this way, the phase displacement of the reflected light with respect to the modulating signal, and therefore, the position of the movable body, is determined.

The above-described optical sensors have a substantial drawback in that the phase displacement measured between the reflected light and the modulating signal does not represent only the position of the remote movable body, but also involves all of the undesirable phase variations induced by the environmental conditions where the optical fiber is operating.

In fact, such variations in temperature, pressure, humidity and so on, together with the length of the optical fiber, which can be some tens of meters, induce variations in the transmission characteristics of the optical fiber, which result in phase displacement of the optical signal not due solely to the position of the movable body. In particular, when the displacements to be measured are very small, of the order of some tens of microns, the false or environmental phase displacements induced by the ambient can distort the measurement of the position of the remote body.

BRIEF DESCRIPTION OF THE INVENTION

It is one object of the present invention to overcome the disadvantages of the prior art sensor and to provide an optical sensor able to determine the position of a remote movable body in which the false phase variations induced by the variations of the environmental conditions where the optical fiber operates, are compensated.

To achieve such object, the present invention provides an optical position sensor, which comprises:

a generator of an optical monochromatic measuring signal, a modulator for the amplitude modulation of the optical measure signal by a radio-frequency electric signal, an optical fiber for the transmission of the optical measuring signal to a remote area and the reception of the optical measuring signal reflected from the remote area, a remote device for the conversion of the position of a remote movable body, with respect to a remote fixed reference element, into an optical measuring reflected signal, a device for the conversion of the optical measuring reflected signal into an electric measuring signal having a frequency equal to the frequency of the modulating electric signal, a phase comparator, a second generator for generating an optical monochromatic reference signal having a wave length different from that of the optical measuring signal, said reference signal also being amplitude modulated by said radio-frequency electric signal and being transmitted by said optical fiber, a second device for the conversion of said reflected optical reference signal into an electric reference signal having a frequency equal to that of the modulating electrical signal, said phase comparator comparing the phases of said electric measuring signal with said electric reference signal, and said remote fixed reference comprises an optical filter which allows the passage of said optical measuring signal and reflects said optical reference signal.

In a preferred embodiment of the invention, the remote fixed reference is a semi-reflecting mirror. In a further preferred embodiment, the reflected optical signals are separated from the transmitted optical signals by means of a directional coupler and the reflected optical signals are separated from one another by means of two semi-reflecting mirrors.

BRIEF DESCRIPTION OF THE DRAWING

The objects and advantages of the invention will be apparent from the following detailed description of the preferred embodiment of the invention which should be considered in conjunction with the accompanying drawing which is a block diagram of the preferred embodiment of the invention.

DETAILED DESCRIPTION OF THE INVENTION

The drawing illustrates a source 1 of monochromatic light having a wave length $\lambda_1$, which generates a so-called "reference" optical signal, and a source 2 of monochromatic light, having a different wave length $\lambda_2$ which generates a so-called "measuring" optical signal. The meaning of such terms will be more clearly understood in the course of the description.

The optical measuring signal $\lambda_2$ and the optical reference signal $\lambda_1$ are amplitude modulated by a radio-frequency electric signal, e.g. having a frequency in the gigahertz range, generated by a modulating means in the form of a modulating signal generator 3. The amplitude modulated measuring signal $\lambda_2$ and the amplitude modulated reference signal $\lambda_1$ are sent to the common input of a directional coupler 4. An optical fiber 5 extends from the output of the directional coupler 4 to a remote point or area adjacent to a movable body 6, the displacements of which are to be measured.

The remote end of the optical fiber 5 is connected for transmitting the measuring signal to the movable body 6, for receiving measuring signal energy reflected from the body 6 and directing it into the optical fiber 5 and for reflecting the reference signal. Such means includes a lens 7, used to focus the light beam coming from the optical fiber 5, and a semi-reflecting mirror 8 which acts as an optical filter and allows the full passage of the optical measuring signal $\lambda_2$ and reflects completely the optical reference signal $\lambda_1$.

The movable body 6 has a surface 9, facing the semi-reflecting mirror 8, which reflects substantially all the light directed thereon.

An optical fiber 10 extends from another output of the directional coupler and to two semi-reflecting mirrors 11 and 12. The semi-reflecting mirror 11 acts as an optical filter, allowing the full passage of the optical reference signal $\lambda_1$ and blocking completely the optical measuring signal $\lambda_2$. Analogously, the semi-reflecting mirror 12 acts as an optical filter, allowing the full passage of the optical measuring signal $\lambda_2$ and blocking completely the reference signal $\lambda_1$.

Two photodiodes 13 and 14 are disposed to receive light passing through the semi-reflecting mirrors 11 and 12, and they convert the optical signals into electric signals. The electric signals of the two photodiodes 13 and 14 are respectively amplified by two operational amplifiers 15 and 16 and are then sent to the two inputs of a phase comparator 17. A variable phase shifter 18 is also connected to the phase comparator 17.

In operation, the amplitude modulated measuring signal $\lambda_2$ and reference signal $\lambda_1$ pass through the directional coupler 4 without being attenuated and, after having been transmitted through the optical fiber 5, along its whole length, reach the remote area where the semi-reflecting mirror 8 acts as a fixed reference for the movable body 6. The optical reference signal $\lambda_1$ is completely reflected by mirror 8 and is therefore reflected exactly at the position of the fixed reference. On the contrary, the optical measuring signal $\lambda_2$ passes completely through mirror 8, strikes the reflecting facing surface 9 of the movable body 6 and is reflected to the mirror 8 and by way of the focusing lens 7 re-enters the optical fiber 5.

In this to-and-from travel with respect to the fixed reference mirror 8, the optical measuring signal $\lambda_2$ has a phase displacement with respect to the optical reference signal $\lambda_1$, which is proportional to the distance existing between the fixed reference mirror 8 and the facing surface 9 of the movable body 6.

Consequently, the phase displacement between the reflected reference signal $\lambda_1$ and the reflected measuring signal $\lambda_2$ represents the distance of the movable body 6 from the fixed reference mirror 8.

The reflected optical signals, namely, the reference signal $\lambda'_1$ of known phase, and the measuring signal $\lambda'_2$, shifted with respect to the reference signal, are transmitted through the optical fiber 5 to the directional coupler 4 where they are directed to the optical fiber 10. The semi-reflecting mirrors 11 and 12 separate the two reflected optical signals $\lambda'_1$ and $\lambda'_2$, allowing the only passage of the measuring signal $\lambda'_2$ and the reference signal $\lambda'_1$, respectively.

Photodiodes 13 and 14 convert the reflected optical reference signal $\lambda'_1$ and measuring signal $\lambda'_2$ into two electrical signals $v_1$ and $v_2$, which have the same frequency as the modulating electric signal and which maintain the same phase relation of the reflected optical signals. The operational amplifiers 15 and 16 amplify the electric signals $v_1$ and $v_2$ and supply them to the phase comparator 17 which measures the phase displacement between the two electric signals $v_1$ and $v_2$, such phase displacement corresponding to the distance of the movable body 6 from the fixed reference mirror 8.

The variable phase shifter 18 is used to adjust the phase comparator 17. A signal from the phase comparator indicating the distance of the body 6 from the mirror 8 can then start when the body 6 deviates from a predetermined position and be supplied to a circuit (not shown) controlling the position of the movable body 6.

The described sensor is able to determine the axial position of a movable body with respect to a fixed reference. Moreover, by simple modifications apparent to those skilled in the art, it can also determine the angular position of a revolving shaft.

From the foregoing description, it is clear that the optical sensor forming the object of the present invention accomplishes the object of compensating the false phase variations of the optical signal measuring the position of the movable body caused by the variations in the environmental conditions. In fact, when these variations take place, the optical fiber changes its transmission characteristics and induces exactly the same phase displacements on both the modulated optical measuring signal and modulated reference signal, so that their phase difference is always and solely that due to the position of the movable body.

In other words, in the conventional optical sensors the reference signal is represented by the electric signal of the modulator and remains "fixed", whereas the optical signal which measures the position of the movable body, by travelling along the optical fiber, is influenced by the interfering phase variations. On the contrary, in the optical sensor according to the present invention, an optical reference signal is generated which, travelling together with the optical signal which measures the position of the movable body, is subjected to the same variations to which the measuring signal is subjected so that, when the phase difference is effected, the interfering phase displacements are compensated and therefore eliminated.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An optical position sensor for measuring the position of a movable body, said sensor comprising:

first and second generators for respectively generating an optical, monochromatic measuring signal of a first wavelength and an optical, monochromatic reference signal of a second wavelength;

modulating means connected to said generators for amplitude modulating the optical signal each of said generators with a radio frequency signal to thereby provide a modulated reference signal and a modulated measuring signal;

an optical fiber having first and second ends with said first end coupled to said generators for transmitting within said optical fiber said amplitude modulated reference signal and said amplitude modulated measuring signal to said second end of said optical fiber at a point spaced from said generators;

transmitting and reflecting means at said second end of said optical fiber for completely reflecting within said optical fiber said amplitude modulated reference signal and fully transmitting said amplitude modulated measuring signal outside said optical fiber to a body, the position of which is to be measured, and for receiving amplitude measuring signal energy reflected from said body, the amplitude modulating signal on the reflected measuring signal having a phase which is dependent upon the position of said body, and for directing said energy reflected from said body into said optical fiber at said second end; and phase comparing means coupled to said optical fiber at said first end for comparing the phase of the modulating signal on said reference signal with the phase of the modulating signal on said reflected measuring signal for determining the phase difference between the amplitude modulating signal on said reflected measuring signal energy and the amplitude modulating signal on said reference signal, such phase difference indicating the distance of the body from said transmitting and reflecting means.

2. An optical position sensor as set forth in claim 1 wherein said phase comparing means comprises means for converting said reflected measuring signal energy into a first electrical signal, means for converting said reflected reference signal into a second electrical signal and means for comparing the phase of said first electrical signal with the phase of said second electrical signal.

3. An optical position sensor as set forth in claim 2 further comprising adjusting means connected to said means for comparing the phase of said first electrical signal with the phase of said second electrical signal for setting the phase difference required to provide an output from the last-mentioned said means.

4. An optical position sensor as set forth in claim 1 wherein said transmitting and reflecting means comprises an optical filter which transmits said modulated measuring signal and reflects said modulated reference signal.

5. An optical position sensor as set forth in claim 4 wherein said optical filter is a semi-reflective mirror which permits the passage of said modulated measuring signal and reflects said modulated reference signal.

6. An optical position sensor as set forth in claim 4 wherein said transmitting and reflecting means comprises a focussing lens coupled to said optical fiber for focussing both said modulated measuring signal and said modulated reference signal on said optical filter.

7. An optical position sensor as set forth in claim 1 wherein said phase comparing means is coupled to said optical fiber by a directional coupler intermediate said generators and said transmitting and reflecting means for separating the modulated measuring signal and the modulated reference signal transmitted by said optical fiber from the reflected and modulated reference signal and the reflected and modulated measuring signal and having an output at which said reflected and modulated reference signal and said reflected and modulated measuring signal are provided.

8. An optical position sensor as set forth in claim 7 wherein said phase comparing means comprises a first optical filter and a second optical filter coupled to said output of said directional coupler for separating the reflected and modulated reference signal from the reflected and modulated measuring signal, said first optical filter passing said reflected and modulated reference signal and blocking said reflected and modulated measuring signal and said second optical filter passing said reflected and modulated measuring signal and blocking said reflected and modulated reference signal.

9. An optical position sensor as set forth in claim 8 wherein each of said first optical filter and said second optical filter is a semi-reflecting mirror.

10. An optical position sensor as set forth in claim 8 wherein said phase comparing means comprises first converting means disposed to receive optical signals passed by said first optical filter and converting them into first electrical signals and second converting means disposed to receive optical signals passed by said second optical filter and converting them into second electrical signals.

11. An optical position sensor as set forth in claim 10 wherein said phase comparing means comprises a phase comparator connected to said first converting means and to said second converting means for comparing the phase of the modulating signal on the signals passed by said first optical filter with the phase of the modulating signal on the signals passed by said second optical filter and for indicating the distance of a reflecting body from said transmitting and reflecting means.

* * * * *